United States Patent [19]
James et al.

[11] Patent Number: 5,772,732
[45] Date of Patent: Jun. 30, 1998

[54] AIR HANDLER FILTER MONITORING APPARATUS AND METHOD

[76] Inventors: Terry Lynn James, 300 Hwy. 66, Conway, S.C. 29526; Tommy M. Buckley, 3735 Limerick Rd., Myrtle Beach, S.C. 29577

[21] Appl. No.: 757,962
[22] Filed: Nov. 25, 1996
[51] Int. Cl.$^6$ ................................................ B01D 46/00
[52] U.S. Cl. ............................. 95/25; 55/271; 55/272; 55/274; 55/DIG. 34; 95/26
[58] Field of Search ............................ 95/26, 25; 55/271, 55/272, 274, DIG. 34

[56] References Cited

U.S. PATENT DOCUMENTS

| | | | |
|---|---|---|---|
| 3,936,284 | 2/1976 | Mason | 55/274 |
| 4,470,833 | 9/1984 | Wolfe | 55/271 |
| 5,205,156 | 4/1993 | Asano | 73/38 |
| 5,236,477 | 8/1993 | Kokatsu | 55/274 |
| 5,294,407 | 3/1994 | Succi et al. | 55/274 |
| 5,378,254 | 1/1995 | Maly | 55/271 |
| 5,428,964 | 7/1995 | Lobdell | 62/176.6 |
| 5,461,368 | 10/1995 | Comer | 340/607 |

FOREIGN PATENT DOCUMENTS

| | | | |
|---|---|---|---|
| 63-147513 | 6/1988 | Japan | 55/271 |
| 63-147514 | 6/1988 | Japan | 55/271 |
| 2-59012 | 2/1990 | Japan | 55/271 |
| 2-135108 | 5/1990 | Japan | 55/271 |
| 3-221113 | 9/1991 | Japan | 55/271 |
| 4-354509 | 12/1992 | Japan | 55/271 |

*Primary Examiner*—Duane S. Smith
*Attorney, Agent, or Firm*—Robert J. Van Der Wall

[57] ABSTRACT

A monitoring apparatus for alerting an operator to the need to change a temperature control system filter includes a mechanism for selecting and setting a primary period of filter use to assure replacement before the filter becomes clogged; a mechanism for counting out the selected primary period; a mechanism for activating a signalling device to signal the operator to replace the filter, absent replacement of the filter; a mechanism for sensing replacement of the filter; and a mechanism for resetting the mechanism for counting to begin the counting out the selected primary period again upon replacement of the filter. The apparatus preferably additionally includes a mechanism for counting out a secondary period measured from the end of the primary period; and a mechanism for shutting down the system at the end of the secondary period absent replacement of the filter. A method of monitoring the filter of an air temperature control system with this apparatus includes the steps of the operator selecting and setting a primary period of filter use appropriate to assure filter replacement before the filter becomes clogged; the apparatus counting out the selected primary period; the apparatus activating the signalling device at the end of the primary period to signal the operator to replace the filter.

14 Claims, 3 Drawing Sheets

AIR HANDLER FILTER MONITORING APPARATUS AND METHOD

BACKGROUND OF THE INVENTION

1. Field of the Invention

The present invention relates generally to the field of air cooling and heating systems and related devices for buildings such as homes. More specifically the present invention relates to a filter status monitoring method and to an apparatus for practicing the method. The apparatus includes an electronic circuit which generates a signal to remind the home owner or service person to replace the filter in the air handler of an attached heating or cooling system, and which shuts down the system to prevent compressor damage. The apparatus performs the method of generating the filter replacement reminder signal at the end of an operator-selected primary period following filter installation, and shutting down the system at the end of a secondary period of substantially shorter duration if the filter is not replaced.

2. Description of the Prior Art

There have previously been devices for alerting an operator to the need to change a filter in an air temperature control system. These devices are intended to maximize operating efficiency, and prevent the filter from becoming clogged and thereby damaging the system compressor.

Mason, U.S. Pat. No. 3,936,284, issued on Feb. 3, 1976, discloses an air filtering apparatus using a prefilter and a final filter for filtering air passing through the apparatus. The apparatus includes a chamber having an inlet and an outlet. A first, or prefilter is disposed across the chamber inlet and a second or final filter is disposed across the chamber outlet. A divider, preferably in the form of a wall, is disposed between the two filters and divides the chamber into two adjacent sub-chambers, and this wall has an opening through which air may pass from the first, or inlet, subchamber into the second, or outlet, subchamber. A blower is also disposed between the two filters is provided for forcibly blowing air from the first subchamber into the second subchamber. Mason further provides an integrated signaling device which monitors both filters and independently signals when one or the other of these filters has accumulated sufficient particulates from the air to require replacement. The concentration of particulate matter in the filter is determined by monitoring pressure differential between the high and low sides of each filter. A problem with Mason is that the filter monitoring mechanism is complex and costly.

Lobdell, U.S. Pat. No. 5,428,964, issued on Jul. 4, 1995, reveals a control for an air quality machine. Lobdell monitors in real-time the quality of air in a work or living space, and includes a portable electronic monitoring device which senses and indicates air quality within a given space. Within its housing the device has a particular sensor for detecting the ambient concentration of aerosols and particulates in the space and for comparing the detected level with a predetermined particulates threshold limit value (TLV). When a particulate level is detected above the TLV, an LED illuminates to indicate that the air quality has become marginal or unacceptable. Air passes through mechanical prefilter media for collection of larger airborne contaminants, then through an ionization section and electrostatic charged grid, mesh, or media for removal of microscopic particulates from the air stream. Once again, the pressure differentials between opposing sides of each system filter are monitored to determine when filter changing is needed, as in Mason.

Asano, et al., U.S. Pat. No. 5,205,156, issued on Apr. 27, 1993, teaches a device for detection of the degree of clogging of a dust filter. In Asano, et al., the air speed on the downstream side of a filter is monitored, and when the detected speed reads too low, the filter is to be replaced. The problems of Mason are again presented.

Other related art includes Kokatsu, U.S. Pat. No. 5,236,477, for a microcomputer-based control device; Maly, et al., U.S. Pat. No. 5,378,254, for a filter sensing apparatus and filter; and Comer, U.S. Pat. No. 5,461,368, for an air filter monitoring device in a system using a multi-speed blower. These prior devices all fail to teach selectable monitored time periods for filter replacement and system shut-down if the filter is not replaced to prevent system damage.

It is thus an object of the present invention to provide reminder apparatus and method for alerting an operator to the need to change a system filter and thus prevent resulting service calls.

It is another object of the present invention to provide such an apparatus and method which permit the operator selection of a primary filter replacement period appropriate to the particular system, and which alerts the operator at the end of the primary filter replacement period.

It is still another object of the present invention to provide such an apparatus and method which shut down the system at the end of a secondary filter replacement period to protect the compressor from damage, if the filter is not replaced.

It is a further object of the present invention to provide such an apparatus and method which include an apparatus program providing means for operator testing of the program and signalling mechanisms.

It is finally an object of the present invention to provide such an apparatus which is economical to manufacture, easy to install and operate, and highly reliable.

SUMMARY OF THE INVENTION

The present invention accomplishes the above-stated objectives, as well as others, as may be determined by a fair reading and interpretation of the entire specification.

A monitoring apparatus is provided for alerting an operator to the need to change a temperature control system filter, including a mechanism for selecting and setting a primary period of filter use to assure replacement before the filter becomes clogged; a mechanism for counting out the selected primary period; a mechanism for activating a signalling device to signal the operator to replace the filter, absent replacement of the filter; a mechanism for sensing replacement of the filter; and a mechanism for resetting the mechanism for counting to begin the counting out the selected primary period again upon replacement of the filter.

The apparatus preferably additionally includes a mechanism for counting out a secondary period measured from the end of the primary period; and a mechanism for shutting down the system at the end of the secondary period absent replacement of the filter. Where the system is controlled by a thermostat, the mechanism for shutting down the system preferably includes a device for supplying power to a relay on the circuit board to disrupt the voltage to the thermostat. The apparatus preferably additionally includes a mechanism for altering the signal generated by the signalling device at the end of the secondary period upon non-replacement of the filter.

The mechanism for counting preferably included an integrated circuit having several pins for input signals, and the mechanism for selecting and setting a primary time period preferably includes three switches that when closed provides a ground voltage signal to the integrated circuit on three separate pins of the integrated circuit, thus selecting three of the four primary time periods. A fourth primary time period is selected by the absence of any of these switches being closed. The mechanism for counting out the primary time period preferably includes a resistor and a grounded capacitor. The mechanism for activating the signalling device preferably includes an integrated circuit. The mechanism for sensing replacement of the filter preferably includes an integrated circuit having a sensing pin, and a lead from the sensing pin to a sensing switch and from the sensing switch to ground. The mechanism for shutting down the system preferably includes a relay to disrupt voltage to the system thermostat and thus to shut down the system.

A monitoring apparatus is also provided for alerting an operator to the need to change a temperature control system filter, including a mechanism for counting out a replacement time period; a mechanism for activating a signalling device to signal the operator to replace the filter, absent replacement of the filter; a mechanism for sensing replacement of the filter; a mechanism for resetting the mechanism for counting to begin the counting out the replacement time period again upon replacement of the filter; and a mechanism for shutting down the system at the end of the replacement time period absent replacement of the filter.

A method is provided of monitoring the filter of an air temperature control system with an apparatus including a protocol for selecting and setting a primary period of filter use to assure replacement before the filter becomes clogged; a protocol for counting out the selected primary period; a protocol for activating signalling device to signal the operator to replace the filter, absent replacement of the filter; a protocol for sensing replacement of the filter; and a protocol for resetting the mechanism for counting to begin the counting out the selected primary period again upon replacement of the filter, including the steps of the operator selecting and setting a primary period of filter use appropriate to assure filter replacement before the filter becomes clogged; the apparatus counting out the selected primary period; the apparatus activating the signalling device at the end of the primary period to signal the operator to replace the filter.

The method preferably includes the additional steps of the operator replacing the filter; the apparatus sensing the filter replacement; the apparatus resetting the mechanism for counting to begin counting out the primary period again upon replacement of the filter. Where the system is controlled by a thermostat, the method preferably includes the additional steps of the apparatus counting out a secondary time period measured from the end of the primary time period; and, at the end of the secondary time period, the apparatus supplying power to a relay on the circuit board to disrupt voltage to the thermostat and thereby to shut down the system. The method preferably includes the still further steps of the apparatus altering the signal generated by the signalling device at the end of the secondary period; and the apparatus remote switch signalling the system not to operate upon removal of the air handler filter, absent replacement of the air filter; and the apparatus altering the signal generated by the signalling device at the end of the secondary period.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
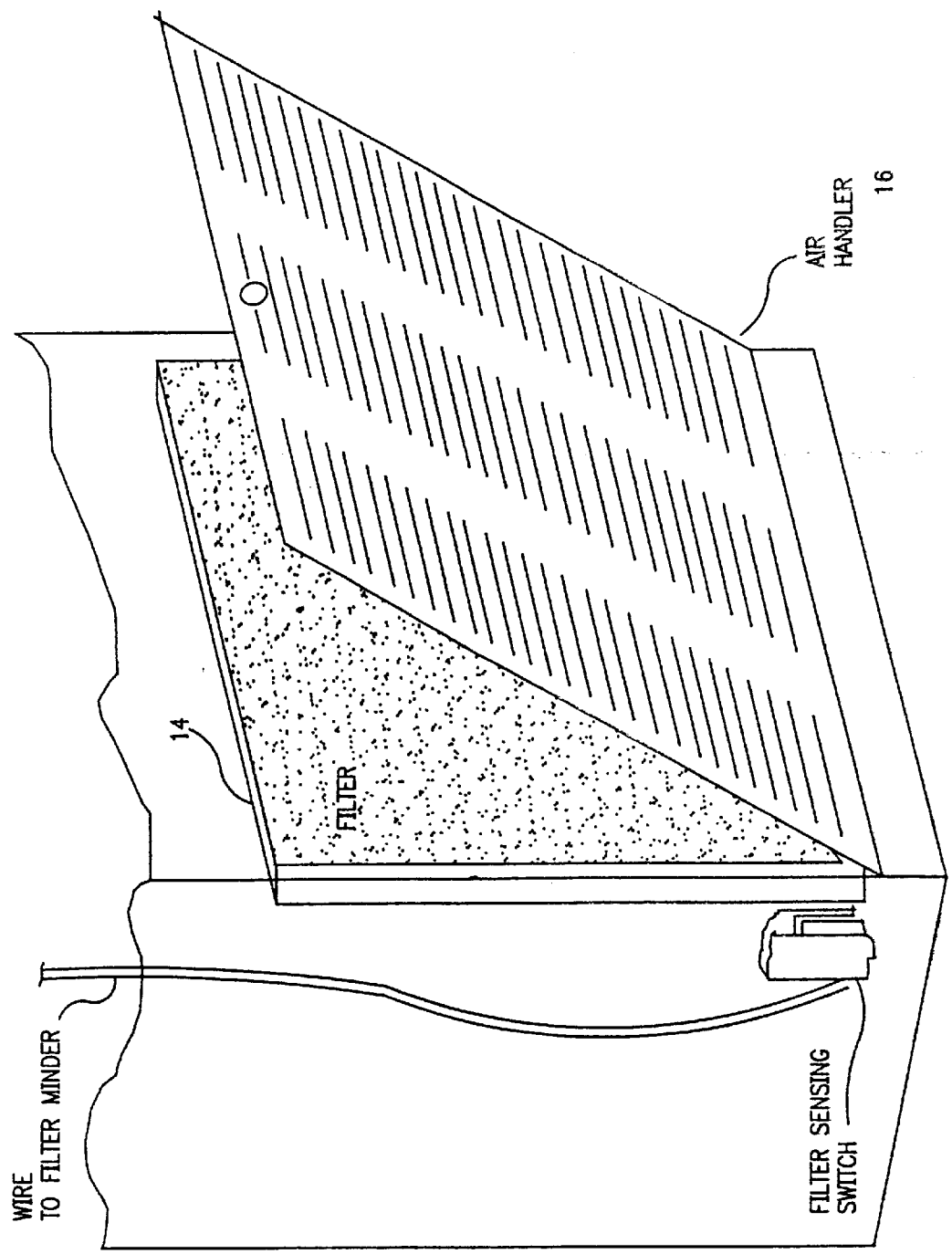
FIG. 1 is a perspective view of the filter handler and filter of an air temperature control system.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

APPARATUS

Figure 2:
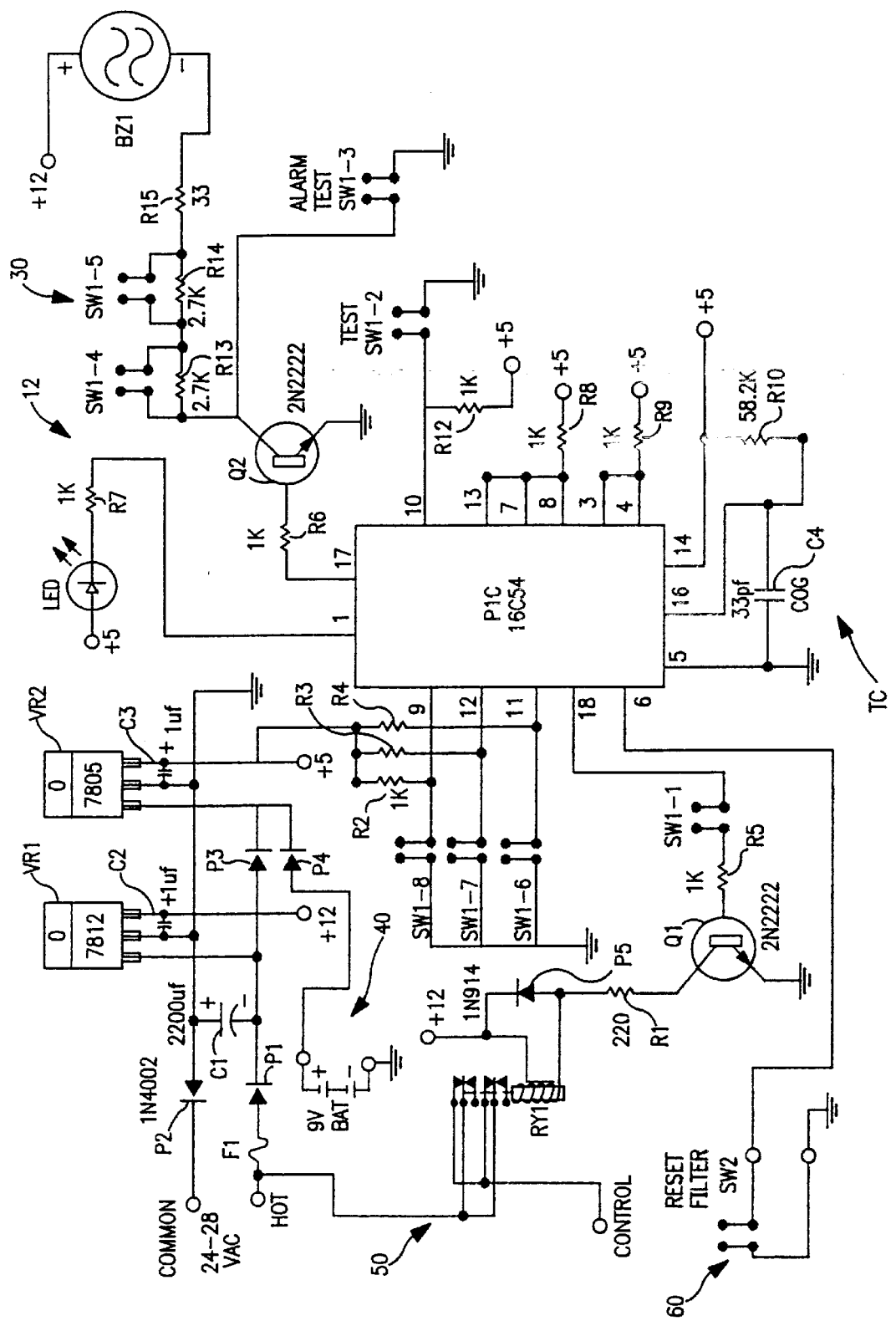
FIG. 2 is a schematic diagram of the inventive circuit of the apparatus preferred embodiment.
Figure 3:
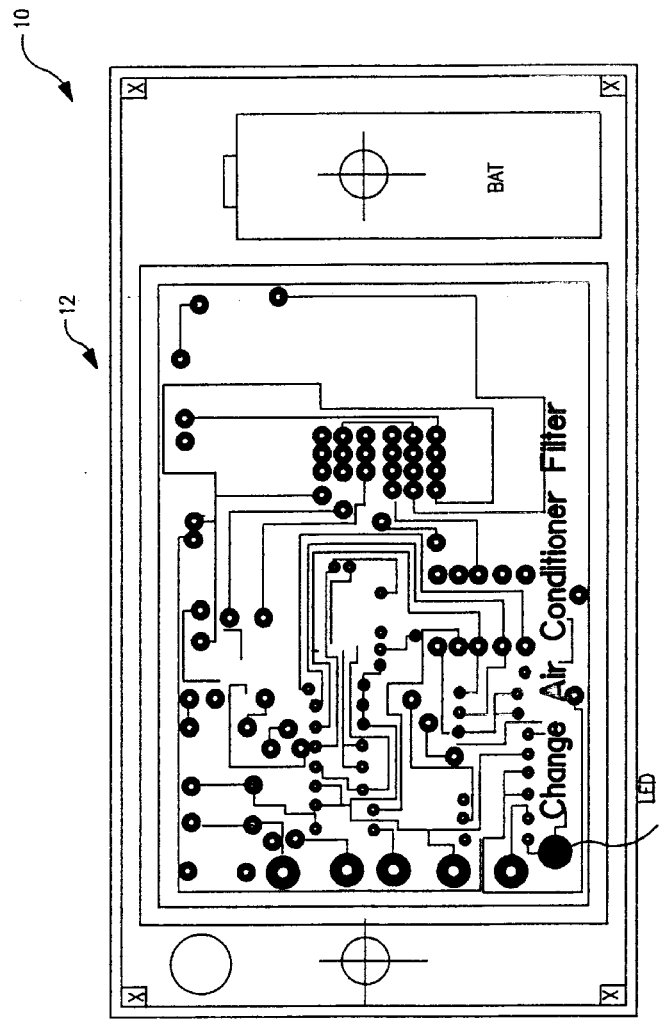
FIG. 3 is a plan view of the physical structure of the inventive circuit of FIG. 2.

Referring to FIGS. 1–3, a filter monitoring apparatus 10 is disclosed including an electronic comprehensive circuit 12 for generating a signal to remind the home owner or service person, hereinafter the operator, to replace a filter 14 in the air handler 16 of an attached air heating or cooling system 20. Apparatus 10 generates a filter replacement reminder signal at the end of an operator-selected primary period, measured from the moment of filter installation, and shuts down the system at the end of a secondary period, measured from the end of the primary period and of shorter duration, if the filter 14 is not replaced.

Comprehensive circuit 12 preferably includes a transformer TR which reduces standard household ac voltage to a magnitude suitable for powering the comprehensive circuit 12. Electric current leaving transformer TR passes through a fuse F1 for protecting circuit 12 against overloads. The ac voltage is then converted to DC voltage by diodes D1 and D2, and the resulting rough DC voltage is smoothed by capacitor C1.

Comprehensive circuit 12 is made up of circuit portions for performing specific functions within apparatus 10, including annunciator circuit 30, battery circuit 40, power circuit 50 and reset circuit 60. Two working DC voltages are required by portions of circuit 12. Five volts are required to power a programmable integrated circuit PIC, preferably a 16C54 chip, and a light emitting diode LED, one of the signalling mechanisms. Twelve volts is required to power a relay functioning as annunciator circuit 30 including a buzzer BZ1. These voltages are provided by a first voltage regulator VR1, preferably a number 7812, for producing 12 volts and a second voltage regulator VR2, preferably a number 7805, for producing 5 volts, by limiting the DC voltages to these first and second levels. Tantalum capacitors C2 and C3 at the base of first and second voltage regulators VR1 and VR2 are needed to assist these regulators in thus limiting the voltages.

Battery circuit 40 is included in circuit 12 to prevent loss of data in integrated circuit PIC in the event that household power is interrupted. Circuit 40 includes a battery BAT is used as a back-up to keep the comprehensive circuitry 12 count cycles current. When running on battery BAT, buzzer BZ1 does not sound and the related relay does not energize, but other parts of the logic function normally and the diode LED lights. Battery circuit 40 includes a standard 9 volt battery BAT which delivers a positive 9 volts through a diode D4 to the input terminal of second voltage regulator VR2 to keep integrated circuit PIC functioning and holding data. Diode D4 also prevents voltages from the normally operating power circuit 50 from charging battery BAT, which is non-rechargeable. To prevent undue drain on battery BAT, diode D3 blocks battery BAT voltage from reaching the first voltage regulator VR1, because regulator VR1 powers components of lesser importance.

The heart of comprehensive circuit 12 is integrated circuit PIC, which is a low cost chip containing a microprocessor for doing calculations, RAM (random access memory) for use as a processor work area and ROM (read only memory) which contains a control program for all of the total circuits input and output logic functions.

--The source code of the control program is as follows:

```
******************** PIC16C5X Header ********************
PIC54    equ   $1FF    ; Define Reset Vectors
;PIC55   equ   $1FF
;PIC56   equ   $3FF    ;
;PIC57   equ   $7FF
;
RTCC     equ   1
PC       equ   2
STATUS   equ   3       ;  F3 Reg is STATUS Reg.
FSR      equ   4
;
PORT_A   equ   5
PORT_B   equ   6       ;I/O Port Assignments
PORT_C   equ   7       ; PORT_C NOT USED ON C54 PIC ;****************** Data RAM Assignments ******************

TEMP   EQU 7  ;USED IN RESET -WAS PORT_C - NOT IN USE ON 16C54 PIC
TEMP2  EQU 8  ;USED IN RESET
TEMP3  EQU 9  ;USED IN LOOP1 & ALARM - 15 SEC COUNTER
TEMP4  EQU 10 ;USED IN LOOP1 & ALARM - 15 SEC COUNTER
TEMP5  EQU 11 ;USED IN LOOP1 & ALARM - 15 SEC COUNTER
```

```
;
TEMP EQU  12
TEMP EQU  13
TEMP EQU  14
;
;COUNTERS 15-21 ARE SPARES  *******************
;
CNE1 EQU 22
CNE2 EQU 23 ;COUNTERS FOR NORMAL EXECUTION
CNE3 EQU 24
;
CP1 EQU 25
CP2 EQU 26
CP3 EQU 27
;
AL1 EQU 28
AL2 EQU 29 ;ALARM - CHANGING COUNTERS
;
PAL1 EQU 30 ;PERMANENT ALARM COUNTERS
PAL2 EQU 31
;
;***************************************************************
;   THIS CROSS ASSEMBLER USES MOTOROLA CONVENTIONS
;
; *   = CURRENT PC
; ' ' = CHARACTER LITERAL
```

```
;  %   = BINARY CONSTANT
;  $   = HEX CONSTANT
;****************************************************************
;
        ORG    0
;
; NEW PROGRAM
;
RESET
        MOVLW  $0        ;SET FOR OUTPUT 0,1,2, AND 3
        TRIS   PORT_A
        MOVLW  $9E
        TRIS   PORT_B
        MOVLW  $03
        MOVLW  TEMP
RES1
        MOVLW  $03
        MOVWF  TEMP2
RES2
        GOTO   TEST
RES3
        DECFSZ TEMP2
        GOTO   RES2
        DECFSZ TEMP
        GOTO   RES1
```

```
INIT
        BTFSC   PORT_B,0  ;SKIP IF BIT IS CLEAR - FILTER MISSING
        GOTO    LOOP1     ;FILTER IS IN
        GOTO    EXIT3     ;FILTER IS MISSING - GOTO PROGRAM END & WAIT
TEST              ;READ TEST SWITCH FOR FASTER COUNT
        BTFSC   PORT_B,4  ;SKIP IF HIGH   ON = ONE
        GOTO    L15
        MOVLW   $01
        MOVWF   CP1
        MOVLW   $01
        MOVWF   CP2
        MOVLW   $01       ;        } LOAD COUNTERS FOR TEST
        MOVWF   CP3
        GOTO    RES3
L15
        BTFSC   PORT_B,3  ;READ SWITCH,GOTO 30 IF SW OFF/ZERO
        GOTO    L30
        MOVLW   $0F
        MOVWF   CP1
        MOVLW   $04
        MOVWF   CP2
        MOVLW   $E1       ;        } LOADS 15 COUNTERS
        MOVWF   CP3
        GOTO    RES3
L30
        BTFSC   PORT_B,6  ;READ SWITCH, GOTO 45 IF SW OFF/ZERO
```

```
        GOTO    L45
        MOVLW   $1E
        MOVWF   CP1
        MOVLW   $04
        MOVWF   CP2
        MOVLW   $E1     ;       } LOADS 30 COUNTERS
        MOVWF   CP3
        GOTO    RES3
L45
        BTFSC   PORT_B,5 ;READ SWITCH, GOTO ASSUME 60 (A60)
        GOTO    A60
        MOVLW   $2D     ;COUNTER 1 AMT
        MOVWF   CP1
        MOVLW   $04     ;COUNTER 2 AMT
        MOVWF   CP2
        MOVLW   $E1     ;COUNTER 3 AMT   } LOADS 45 COUNTERS
        MOVWF   CP3
        GOTO    RES3
A60
        MOVLW   $3C     ;COUNTER 1 AMOUNT        LSD
        MOVWF   CP1     ;
        MOVLW   $04     ;COUNTER 2 AMOUNT
        MOVWF   CP2
        MOVLW   $E1     ;COUNTER 3 AMOUNT   } LOADS 60 COUNTERS
        MOVWF   CP3
        GOTO    RES3
```

```
;
;****************************************************************
;                        M A I N   L O O P
;****************************************************************
LOOP1                           ;NORMAL COUNT LOOP
     BSF    PORT_A,2            ;TURNS LED OFF
CT1
     MOVF   CP1,0
     MOVWF  CNE1
CT2
     MOVF   CP2,0
     MOVWF  CNE2
CT3
     MOVF   CP3,0
     MOVWF  CNE3
MINUTE
     MOVLW  $D1                 ;START OF 15 SECOND COUNTER
     MOVWF  TEMP3
MIN1
     MOVLW  $D1                 ;FINE TUNE FOR EXACTLY 15 SECONDS
     MOVWF  TEMP4
MIN2
     MOVLW  $05
     MOVWF  TEMP5
MIN3
     BTFSS  PORT_B,0            ;RESET SWITCH CHECK
```

```
        GOTO    EXIT3           ;EXIT IF SWITCH IS CLEAR
        DECFSZ  TEMP5
        GOTO    MIN3
        DECFSZ  TEMP4
        GOTO    MIN2
        DECFSZ  TEMP3
        GOTO    MIN1
        NOP                     ;END OF 15 SECOND COUNTER
        DECFSZ  CNE3            ;COUNTER DEC - 3 LEVELS
        GOTO    MINUTE
        DECFSZ  CNE2
        GOTO    CT3
        DECFSZ  CNE1
        GOTO    CT2
        NOP                     ;DONE
;
;****************************************************************
;                       A L A R M
;****************************************************************
;
LOOP2                           ;ALARM LOOP - 3 DAYS - ADJUSTABLE
        BTFSS   PORT_B,0        ;SKIP IF RESET SW IS GROUNDED
        GOTO    EXIT3
        BTFSS   PORT_B,4        ;IS TEST SWITCH ON?  CLR=OFF - NO TEST
        GOTO    TEST1           ;SWITCH IS SET,YES-GOTO TEST
DAYSX3
```

```
        MOVLW   $90          ;SWITCH IS CLEAR - NO TEST
        MOVWF   PAL1
        MOVLW   $78
        MOVMF   PAL2         ;THESE ARE NORMAL OPERATION VALUES
        GOTO    ALARM
TEST1
        MOVLW   $01
        MOVWF   PAL1
        MOVLW   $01
        MOVWF   PAL2
ALARM
        MOVF    PAL2
        MOVWF   AL2
LOAD1A
        MOVF    PAL1
        MOVWF   AL1
;-----------------------------------------------------------------
MINUTEB
        MOVLW   $1B          ;START OF 15 SECOND COUNTER
        MOVWF   TEMP3
MIN1B
        BTFSS   PORT_A,2     ;IS THE LED OFF
        GOTO    LEDOFF       ;IT IS NOT, SO BRANCH TO LED OFF
        BCF     PORT_A,2     ;IT IS OFF, SO TURN LED ON
        BSF     PORT_A,0     ;ALSO TURN ON ALARM
        GOTO    LEDFIN
```

```
LEDOFF
      BSF    PORT_A,2     ;TURN LED OFF
      BCF    PORT_A,0     ;TURN ALARM OFF - TOGGLES
LEDFIN
      MOVLW  $60
      MOVWF  TEMP4
MIN2B
      MOVLW  $60          ;FINE TUNE FOR EXACTLY 15 SECONDS
      MOVWF  TEMP5
MIN3B
      BTFSS  PORT_B,0     ;RESET SWITCH TEST
      GOTO   EXIT3
      DECFSZ TEMP5
      GOTO   MIN3B
      DECFSZ TEMP4
      GOTO   MIN2B
      DECFSZ TEMP3
      GOTO   MIN1B
      NOP                 ;END OF 15 SECOND COUNTER
;------------------------------------------------------------
DEC2
      BTFSS  PORT_B,0     ;SKIP IF RESET SWITCH IS NOT GROUNDED
      GOTO   EXIT3        ;RESET SWITCH IS GROUNDED
      DECFSZ AL1          ;RESET IS HIGH - NO RESET
      GOTO   DEC2
      DECFSZ AL2
```

```
        GOTO    LOAD1A
        NOP                     ;COUNT SATISFIED FOR TEST OR NORMAL OP.
;
;****************************************************************
;                       R E L A Y
;****************************************************************
;
LOOP3                           ;RELAY PICKED LOOP
        BSF     PORT_A,1        ;PICK RELAY
        MOVLW   $20
        MOVWF   CNE2            ;SET C2 RATE OF BLINK/CHIRP
L3A
        MOVLW   $20
        MOVWF   CNE1            ;SET C1 RATE OF BLINK/CHIRP
L3B
        BTFSS   PORT_B,0        ;SKIP IF RESET SWITCH IS NOT GROUNDED
        GOTO    EXIT3           ;RESET IS GROUNDED
        DECFSZ  CNE1
        GOTO    L3B
        DECFSZ  CNE2
        GOTO    L3A
        BTFSS   PORT_A,2        ;SKIP IF LED IS OFF
        GOTO    RELOFF
        BSF     PORT_A,0        ;TURN ALARM ON
        BCF     PORT_A,2        ;TURN LED IN
        GOTO    LOOP3
```

```
RELOFF
    BCF    PORT_A,0      ;TURN ALARM OFF
    BSF    PORT_A,2      ;TURN LED OFF
    GOTO   LOOP3
;-----------------------------------------------------------------
EXIT3
    BSF    PORT_A,1      ;RELAY STILL ON - REFRESHED
    BCF    PORT_A,2      ;LED ON SOLID (OPPOSITE STATE DRIVES LED)
    BTFSS  PORT_B,0      ;SKIP OF RESET SWITCH IS NOT GROUNDED
    GOTO   EXIT3         ;RESET IS GROUNDED
    BCF    PORT_A,1      ;RESET OFF --FILTER IS BACK IN
    BSF    PORT_A,2      ;LED OFF -OPPOSITE STATE
    BCF    PORT_A,0      ;ALARM OFF
    GOTO   RESET
;---------------------- END OF PROGRAM -----------------------
--.
```

In the Claims:

Pins 1–18 extend from integrated circuit PIC and are connected to various portions of circuit 12 to perform specific functions, as follows:

Pin 1 is an output that controls the light emitting diode LED, and resistor R7 limits the current used by diode LED. Diode LED already has 5 volts allied to its anode. Pin 1 sends the signal ground to the cathode to make diode LED light, and thereby function as a visual indicator to the operator.

Pin 17 drives the annunciator circuit 30 containing buzzer BZ1 by sending ground signal pulses to the negative terminal of buzzer BZ1. Buzzer BZ1 is constantly connected to 12 volts on its other terminal unless buzzer BZ1 is operating on battery power. Resistor R15 limits the maximum current to buzzer BZ1. Switches 1-4 and 1-5 on switch bank 1 control the current level reaching buzzer BZ1 to permit the operator to tune a desired loudness of the buzzer by either switching in or bypassing resistors R13 and R14. Transistor Q2 permits annunciator circuit 30 to function by passing the ground signal to buzzer BZ1 when the signal at pin 17 goes high. Resistor R6 is a current limiting resistor for transistor Q2. Switch 1-3 of this leg of annunciator circuit 30 causes buzzer BZ1 to continuously sound if closed. Switch 1-3 is used to activate buzzer BZ1 alarm buzzer during installation to test its loudness.

Pin 10 is an input which is normally tied high by the 5 volts level coming through resistor R12. Closing test switch 1-2 sends a ground level voltage to integrated circuit PIC and signals it during testing or installation to run a program simulating all functions in a span of less than one minute.

Pins 13, 7 and 8 are unused and must be tied to a high signal level of +5 volts through resistor R8. Pins 3 and 4 are unused and must be tied to a high signal level of +5 volts through resistor R9.

Pins 5, 16 and 14 work in conjunction with capacitor C4 and resistor R10 to set up the timing clock TC for integrated circuit PIC. The clock TC speed is several thousand cycles per second. Pin 14 is also the +5 volts power input and pin 5 is the supply ground for integrated circuit PIC. Capacitor C4 is a type of capacitor that holds its value when subjected to temperature changes, and resistor R10 is a type of resistor that has a more critical value (within 1%) than normal resistors.

Pin 6 is an input which resets integrated circuit PIC when it is grounded through switch 2. Switch 2 is not on comprehensive circuit 12 mounting board, but is mounted to the system in such a way that the filter 14 for the system air return holds switch 2 open. Removing the filter 14 to change it resets this reset circuit 60. Leaving filter 14 out of air handler 16 causes this reset circuit 60 to disable all functions of the thermostat when switch 1-1 is on. Switch 2 is a normally closed switch, held open by the presence of the filter 14 in the air handler 16.

Pin 18 is an output which drives transistor Q1 through resistor R5 into a state that allows a voltage ground, through limiting resistor R1, to reach the pick coil of relay RY1. Diode D5 prevents feed back of current into transistor Q1 when the voltage ground is removed and the pick coil voltage relaxes. Switch 1-1 of this leg provides a method of turning off this feature of picking the relay RY1. When relay RY1 is picked, the normally closed contacts of relay RY1 are opened and 24–28 VAC is removed from the thermostat, thereby preventing operation of system 20. Relay RY1 is preferably a 12 VDC type. The connection labeled CONTROL in FIG. 2 controls the thermostat. There are two sets of contacts in relay RY1 and they are used in parallel to permit longer contact life if high thermostat currents are experienced through these points.

Pins 9, 11 and 12 control the duration of the primary period. Pin 9 is held high (+5 volts) by resistor R2. If switch 1-8 is closed, a ground signal is provided to integrated circuit PIC to signal a primary period duration of 15 days. Pin 12 is held high (+5 volts) by resistor R3. If switch 1-7 is closed, a ground signal is provided to integrated circuit PIC to signal a primary period duration of 30 days. Pin 11 is held high (+5 volts) by resistor R4. If switch 1-5 is closed, a ground signal is provided to the integrated circuit PIC to signal a primary period duration of 45 days. When none of the timing switches is closed, a default value of 60 days primary period duration will occur. Comprehensive circuit 12 operates on standard household 24–28 VAC power which is commonly used to operate a system thermostat. Circuit 12 draws very low levels of current during its operation.

METHOD

In practicing the invention, the following method may be used. The method includes the steps of: the operator selecting and setting a primary period of filter 14 use of a duration assuring replacement before filter 14 clogging; apparatus 10 clock circuit TC counting out the selected primary period; apparatus 10 activating signalling means, such as an annunciator in the form of buzzer BZ1 and a light source in the form of diode LED in an on and off flashing sequence, to signal the operator to replace the filter 14; and resetting clock circuit TC to begin the primary period counting cycle again upon replacement of the air handler filter 14.

Additional conditional steps include those of: if filter 14 is not replaced by the end of the primary period, the apparatus 10 clock circuit TC counting out a secondary time period measured from the end of the primary time period; if the filter 14 is not replaced by the end of the secondary time period, apparatus 10 supplying power to a relay on the circuit 12 mounting board to disrupt the 24 volt control to the system 20 thermostat and thus to shut down system 20; apparatus 10 also preferably causing buzzer BZ1 to generate sounds at faster paced intervals and also preferably causing diode LED to flash at a more rapid rate. The secondary period preferably, but not necessarily, has a duration of three days.

A further conditional step is that of: if the air handler filter 14 is removed and not replaced, the apparatus 10 causing the apparatus remote switch to signal the system 20 not to operate by removing the 24 volt control to the system 20 thermostat. This step is preferably combined with the step of simultaneous activation of diode LED continuously rather than in a series of flashes, and non-activation of buzzer BZ1.

Still further conditional steps include those of: the operator turning switch 1 on the apparatus circuit 12 mounting board to the off position to prevent shutdown of system 20 while apparatus 10 is being installed in a critical area, such that apparatus 10 only generates the reminder signal for the operator; and the operator turning switch 2 on the apparatus circuit 12 mounting board to the on position to test apparatus 10 when the installer or system technician desires to test apparatus 10, such as in the event a malfunction is suspected.

The program embedded in integrated circuit PIC also provides apparatus 10 test sequences. One test sequence begins automatically when apparatus 10 is activated. This is an optional step in which the program counts out a preprogrammed length of time, such as 15 seconds, and then activates the signalling means for a length of time such as 15 seconds, and then actuates the relay, if switch 1 is on, and the buzzer BZ1 sound and diode LED flash are made noticeably more intense.

The operator optionally performs a step of turning switch 3 on the circuit 12 mounting board on to test the loudness of buzzer BZ1. When switch 3 is turned on, buzzer BZ1 sounds continuously and allows the operator to operate switches 4 and 5 to adjust the audio level of buzzer BZ1 appropriately for the environment in which apparatus 10 is installed.

The operator optionally performs the step of turning switches 8, 7 and 6 on the circuit 12 mounting board on to select the number of days making up the primary period. The operator turns on these switches to select 15, 30 or 45 days, respectively, as noted above, or turns off all of these switches to cause the count to default to 60 days. Switches 8, 7 and 6 are prioritized in this same order. For example, if switch 2 is off and switches 8 and 6 are on, the primary period is 15 days because of its priority in the circuit design. The alarm test switch 2 overrides switches 8, 7 and 6.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A monitoring apparatus for alerting an operator to the need to change a filter in a temperature control system, comprising:

means for selecting and setting a primary period of filter use to assure replacement before the filter becomes clogged;

means for counting out the selected primary period;

means for activating signalling means to signal the operator to replace the filter, absent replacement of the filter;

means for sensing replacement of the filter;

means for resetting the means for counting to begin the counting out the selected primary period again upon replacement of the filter;

means for counting out a secondary period measured from the end of the primary period; and means for shutting down the system at the end of the secondary period absent replacement of the filter.

2. The apparatus of claim 1, wherein the system is controlled by a thermostat and wherein said means for shutting down the system comprises means for supplying power to a relay on the circuit board to disrupt the voltage to the system thermostat.

3. The apparatus of claim 1, additionally comprising:

means for altering the signal generated by said signalling means at the end of the secondary period upon non-replacement of the filter.

4. The apparatus of claim 1, wherein said means for counting comprises an integrated circuit having a plurality of pins, wherein said means for selecting and setting a primary time period comprises a first ground wire connected to a first said pin, and a second ground wire connected to a second said pin, each said ground wire being interrupted by a switch, the selective closing of said switches determining the duration of the primary time period.

5. The apparatus of claim 1, wherein said means for counting out said primary time period comprises a resistor and a grounded capacitor.

6. The apparatus of claim 1, wherein said means for activating signalling means comprises an integrated circuit.

7. The apparatus of claim 1, wherein said means for sensing replacement of the filter comprises an integrated circuit having a sensing pin, and a lead from the sensing pin to a sensing switch and from the sensing switch to ground.

8. The apparatus of claim 1, wherein said means for shutting down the system comprises a relay to disrupt voltage to the system thermostat and thus to shut down the system.

9. A monitoring apparatus for alerting an operator to the need to change a temperature control system filter, comprising:

means for counting out a replacement time primary period;

means for activating signalling means to signal the operator to replace the filter, absent replacement of the filter;

means for sensing replacement of the filter;

means for resetting the means for counting to begin the counting out the replacement time period again upon replacement of the filter;

means for counting out a secondary period measured from the end of the primary period; and means for shutting down the system at the end of the secondary period absent replacement of the filter.

10. A method of monitoring a filter of an air temperature control system operated by a thermostat with an apparatus having means for selecting and setting a primary period of filter use to assure replacement before the filter becomes clogged; means for counting out the selected primary period; means for activating signalling means to signal the operator to replace the filter, absent replacement of the filter; means for sensing replacement of the filter; means for resetting the means for counting to begin the counting out the selected primary period again upon replacement of the filter, comprising the steps of:

an operator selecting and setting a primary period of filter use appropriate to assure filter replacement before the filter becomes clogged;

the apparatus counting out the selected primary period;

the apparatus activating signalling means at the end of the primary period to signal the operator to replace the filter;

the apparatus counting out a secondary time period measured from the end of the primary time period;

at the end of the secondary time period, apparatus supplying power to a relay on the circuit board to disrupt voltage to the thermostat and thereby to shut down the system.

11. The method of claim 10, comprising the additional steps of the operator replacing the filter; the apparatus sensing the filter replacement; and the apparatus resetting the means for counting to begin counting out the primary period again upon replacement of the filter.

12. The method of claim 10, comprising the additional step of:

the apparatus altering the signal generated by said signalling means at the end of the secondary period.

13. The method of claim 10, comprising the additional step of:

the program causing the apparatus remote switch to signal the system not to operate upon removal and non-replacement of the air handler filter.

14. The method of claim 13, comprising the additional step of:

the apparatus altering the signal generated by said signalling means at the end of the secondary period.

* * * * *